United States Patent
Cooke et al.

(10) Patent No.: US 8,961,032 B2
(45) Date of Patent: Feb. 24, 2015

(54) CABLE LEG AND CONNECTOR MANAGEMENT SYSTEM

(75) Inventors: Terry L. Cooke, Hickory, NC (US); Christopher S. Houser, Newton, NC (US); Ronald A. Leonard, Connelly Springs, NC (US); James M. Wilson, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 345 days.

(21) Appl. No.: 13/420,079

(22) Filed: Mar. 14, 2012

(65) Prior Publication Data

US 2013/0209037 A1 Aug. 15, 2013

Related U.S. Application Data

(60) Provisional application No. 61/596,896, filed on Feb. 9, 2012.

(51) Int. Cl.
*G02B 6/38* (2006.01)
(52) U.S. Cl.
USPC ............................................................ 385/59
(58) Field of Classification Search
USPC ............................................................ 385/59
See application file for complete search history.

(56) References Cited

U.S. PATENT DOCUMENTS

2012/0301090 A1* 11/2012 Cline et al. ..................... 385/103

FOREIGN PATENT DOCUMENTS

EP 1172672 1/2002 .............. G02B 6/38

* cited by examiner

*Primary Examiner* — Jerry Blevins

(57) ABSTRACT

An interconnect assembly includes an optical fiber cable, legs, connectors, and covers. The optical fiber cable includes a jacket and sub-units. The jacket has an interior defining a passage and the sub-units extend through the passage and include optical fibers extending lengthwise through the sub-units. The legs of the interconnect assembly extend from the passage on an end of the jacket, where the legs are continuations of or extensions from the sub-units such that the optical fibers further extend through the legs. The connectors are attached to the optical fibers on distal ends of the legs and the covers are attached to the connectors. The covers each include an end having a track for wrapping one or more of the legs over in order to package the legs and connectors, such as for placement of the legs and connectors within a pulling grip for installation of the interconnect assembly through a duct.

9 Claims, 6 Drawing Sheets

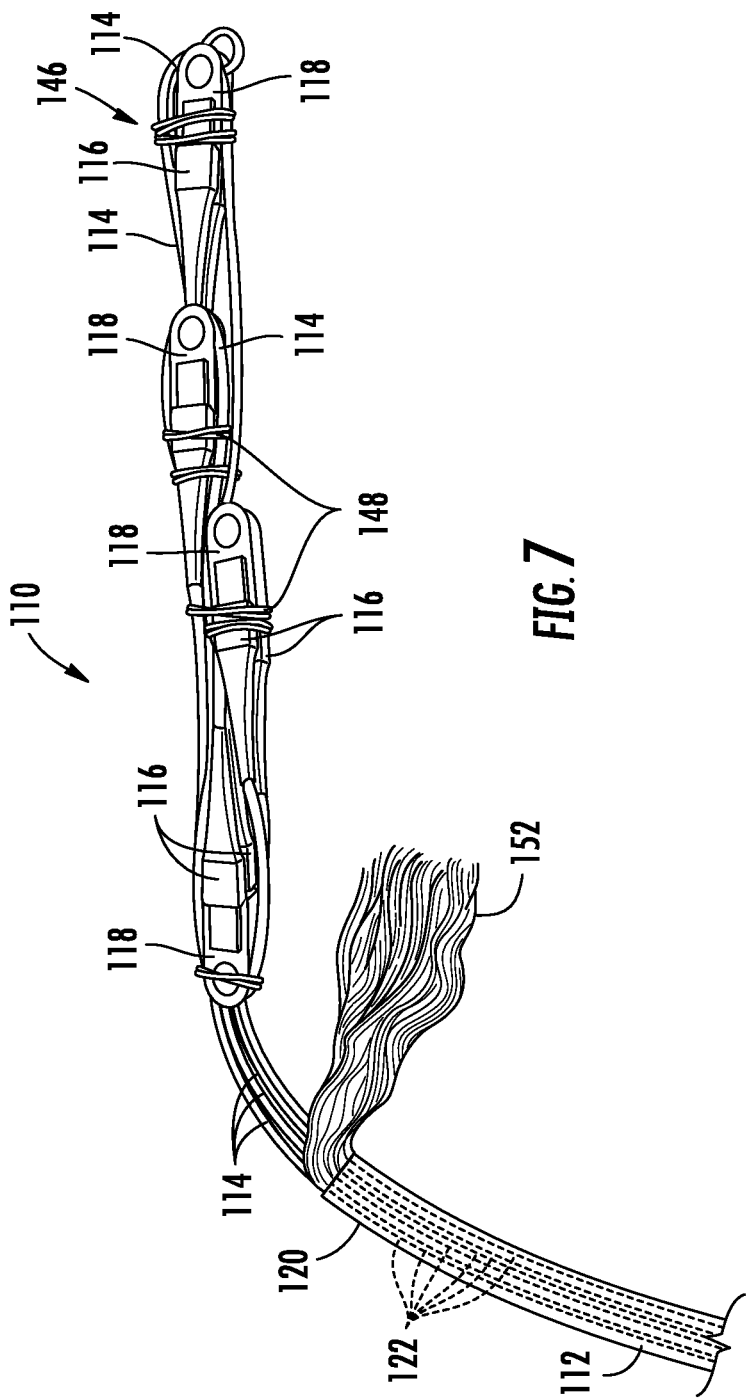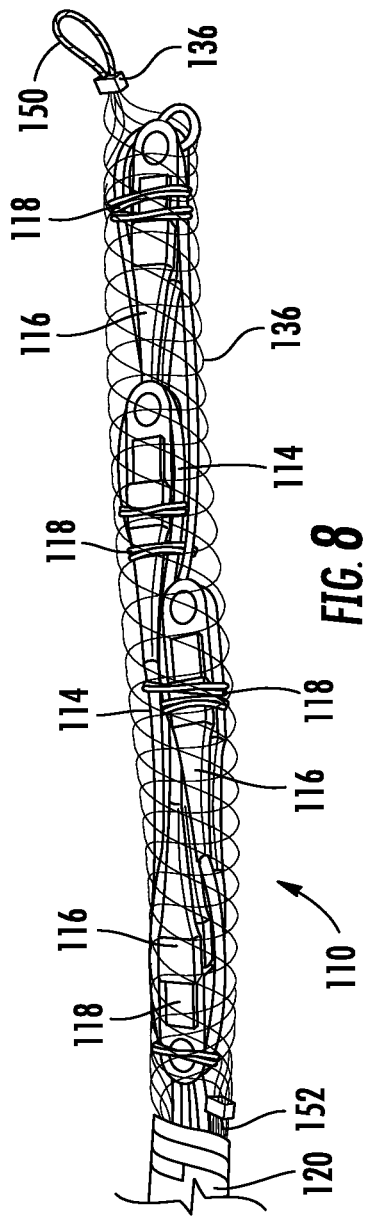

CABLE LEG AND CONNECTOR MANAGEMENT SYSTEM

PRIORITY CLAIM

This application claims the benefit of priority under 35 U.S.C. §119 of U.S. Provisional Application Ser. No. 61/596,896 filed on Feb. 9, 2012 the content of which is relied upon and incorporated herein by reference in its entirety.

BACKGROUND

The present disclosure relates generally to interconnect assemblies using optical fiber cables. More specifically, the present disclosure relates to devices and methods for managing furcated legs and connectors of the interconnect assemblies such that the interconnect assemblies may be drawn through conduits in a manner protecting the interconnect assemblies, such as during installation of the interconnect assemblies in narrow ducts of data centers or elsewhere.

An interconnect assembly using an optical fiber cable for high-speed data transmission may include connectors attached to furcated (i.e., separated) legs of the optical fiber cable that contain subsets of the optical fibers of the cable. During installation of the interconnect assembly in a data center or elsewhere, the interconnect assembly may be routed through ducts to different areas in the data center. The ducts are generally selected to be as narrow as possible while still allowing passage of the interconnect assemblies.

Pulling grips may be used to package the connectors and furcated legs of the interconnect assembly while providing an attachment point for a line to draw the interconnect assembly through a duct. However, for particularly narrow ducts, packaging of the legs and connectors in a pulling grip may be difficult without over bending the optical fibers or supporting structure of the cable. As such, a need exists for a management system that facilitates packaging of cable legs and connectors in a manner that allows for movement of the interconnect assembly through a narrow duct while not over bending the optical fibers or other components of the interconnect assembly.

SUMMARY

One embodiment relates to an interconnect assembly, which includes an optical fiber cable, legs, connectors, and covers. The optical fiber cable includes a jacket and sub-units. The jacket has an interior defining a passage and the sub-units extend through the passage and include optical fibers extending lengthwise through the sub-units. The legs of the interconnect assembly extend from the passage on an end of the jacket, and the legs are continuations of or extensions from the sub-units such that the optical fibers further extend through the legs. The connectors are attached to the optical fibers on distal ends of the legs and the covers are attached to the connectors. The covers each include an end having a track for wrapping one or more of the legs over in order to package the legs and connectors, such as for placement of the legs and connectors within a pulling grip for installation of the interconnect assembly through a duct.

Another embodiment relates to a method of using an interconnect assembly. The method includes a step of wrapping a leg of the interconnect assembly around an end of a cover attached to a connector of the interconnect assembly. The end of the cover includes a track having a bend-limiting feature around the end. The bend is arcuate and has a radius of curvature throughout the bend that is greater than the minimum bend radius of optical fiber in the leg such that the track facilitates controlled bending of the leg during the step of wrapping.

Yet another embodiment relates to a cover for a connector attached to a leg of an interconnect assembly using an optical fiber cable. The cover includes first and second ends. The first end has an opening directed to an interior of the cover and the opening is configured to receive at least a portion of the connector for placement in the interior of the cover. The second end is opposite to the first end and includes a track around an exterior of the second end. The track includes raised sides and a channel between the raised sides such that the track is configured to guide the leg when wrapped about the second end on the track. The track curves around the exterior of the second end in an arcuate bend such that the track facilitates controlled bending of the leg.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 7 is a perspective view of the interconnect assembly of FIG. 1 in an arrangement with the legs and connectors wrapped about covers according to an exemplary embodiment.

FIG. 8 is a perspective view of the interconnect assembly as arranged in FIG. 7 within a pulling grip according to an exemplary embodiment.

DETAILED DESCRIPTION

Before turning to the figures, which illustrate the exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
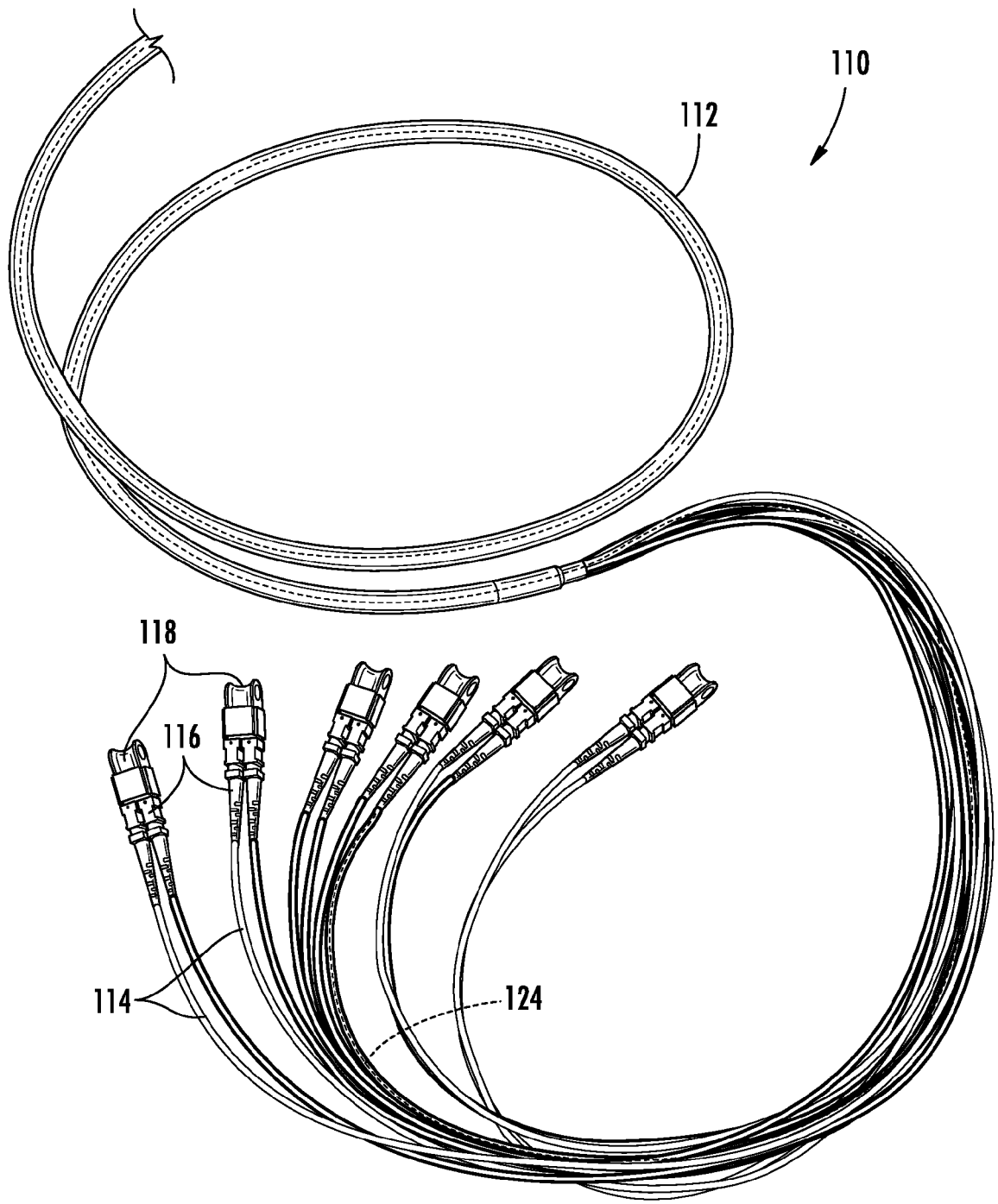
FIG. 1 is a perspective view of an interconnect assembly according to an exemplary embodiment.

Referring to FIG. 1 and more generally to FIGS. 2-4 and 6-10, an interconnect assembly, shown as a harness-type interconnect assembly 110, includes an optical fiber cable 112 (e.g., trunk cable), furcated legs 114, connectors 116 coupled to distal ends of the legs 114, and covers 118 attached to the connectors 116. As better shown in FIG. 7, the optical fiber cable 112 includes a jacket 120 and sub-units 122 (e.g., micro-sub-units). The jacket 120 has an interior that defines a passage (e.g., tunnel, conduit) extending though the jacket 120, and the sub-units 122 extend through the passage. According to an exemplary embodiment, the legs 114 project from (e.g., extend from) the passage of the jacket 120 on an end or both ends of the jacket 120. The legs 114 are continuations of or extensions from at least a portion of one or more of the sub-units 122.

The sub-units 122 include optical fibers 124 (see also FIG. 6) that extend through the sub-units 122 lengthwise through the jacket 120 and further extend through the legs 114. In some embodiments, the sub-units 122 of the optical fiber cable 112 include loose-tube optical fibers (e.g., discrete optical fibers extending within buffer tubes), tight-buffered optical fibers, ribbons of optical fibers, stacks of ribbons of optical fibers within buffer tubes, or other arrangements. The jacket 120, sub-units 122, and/or legs 114 may be formed from fluoropolymers such as polyvinylidene fluoride (PVDF), polytetrafluoroethylene (PTFE), or polyurethane, polypropylene, polybutylene terephthalate (PBT), or other materials. In some embodiments, the interconnect assembly 110 may include hybrid optical fiber cables using more than one type of optical fiber, composite optical fiber cables using both copper and optical fibers, traditional optical fiber cables, such as 144-fiber cables containing twelve loose-tube sub-units of twelve individual optical fibers per sub-units, or other types of optical fiber cables.

According to an exemplary embodiment, the sub-units 122 and legs 114 include one or more optical fibers 124 per sub-unit 122 or leg 114. In some embodiments, the optical fibers 124 of the sub-units 122 are inserted and passed through separate buffer tubes (e.g., thin-walled buffer tubes, furcation tubes) that become the legs 114 of the interconnect assembly 110. In other embodiments, an end portion of the jacket 112 is removed, exposing the sub-units 122, and the sub-units 122 themselves become the legs 114 of the interconnect assembly 110. In various embodiments, legs 114 of the interconnect assembly 110 may each be different lengths such that the connectors 116 are staggered, only some of the legs 114 may be different in length from others of the legs 114, or all the legs 114 may be the same length.

According to an exemplary embodiment, the furcated legs 114 are connectorized (e.g., pre-connectorized, connectorized during manufacturing) with the connectors 116, which may be local connectors (e.g., duplex LC connectors) configured for a wide range of network applications. In other embodiments, less than all of the legs 114 are connectorized. In some embodiments, the interconnect assembly 110 may be a harness assembly, as shown in FIG. 1, having furcated legs 114 and connectors 116 on one end of the assembly 110 and a single multi-connector (not shown) on the other end of the assembly 110, such as a multiple-fiber push-on/pull-off connector (e.g., MTP connector). In other embodiments, both ends of the interconnect assembly 110 may include furcated legs 114 that are connectorized with connectors 116. In still other embodiments, other interconnect assembly configurations and types of optical fiber connectors may be used.

Figure 2:
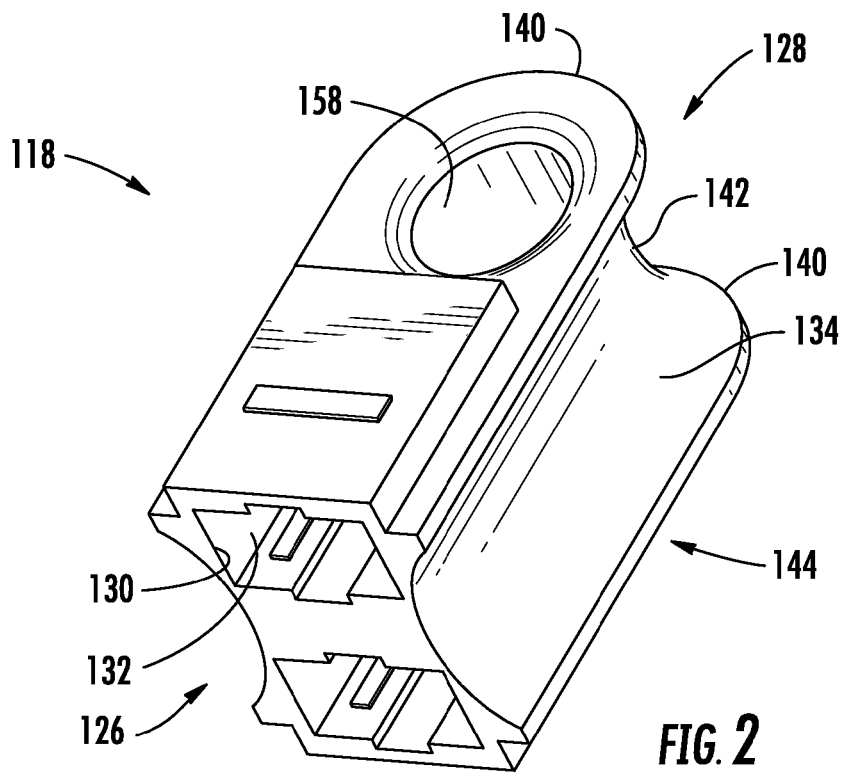
FIG. 2 is a perspective view of a cover of a connector of the interconnect assembly of FIG. 1 from a first perspective according to an exemplary embodiment.

Referring to FIGS. 1-4, covers 118 (e.g., guides, end caps) are attached to the connectors 116. According to an exemplary embodiment, the covers 118 each include a first end 126 and a second end 128 (e.g., distal end). As shown in FIG. 2, the first end 126 includes an opening 130 directed to an interior 132 (e.g., cavity) of the cover 118. The opening 130 is configured to receive at least a portion (e.g., end, face) of a corresponding one of the connectors 116 for placement of the portion of the connector 116 in the interior 132 of the cover 118. The second end 128 of the cover 118 has a track 134 for wrapping one or more of the legs 114 around in order to efficiently package the legs 114 and connectors 116 of the interconnect assembly 110 for placement of the legs 114 and connectors 116 within a pulling grip 136 (see FIG. 8).

Figure 3:
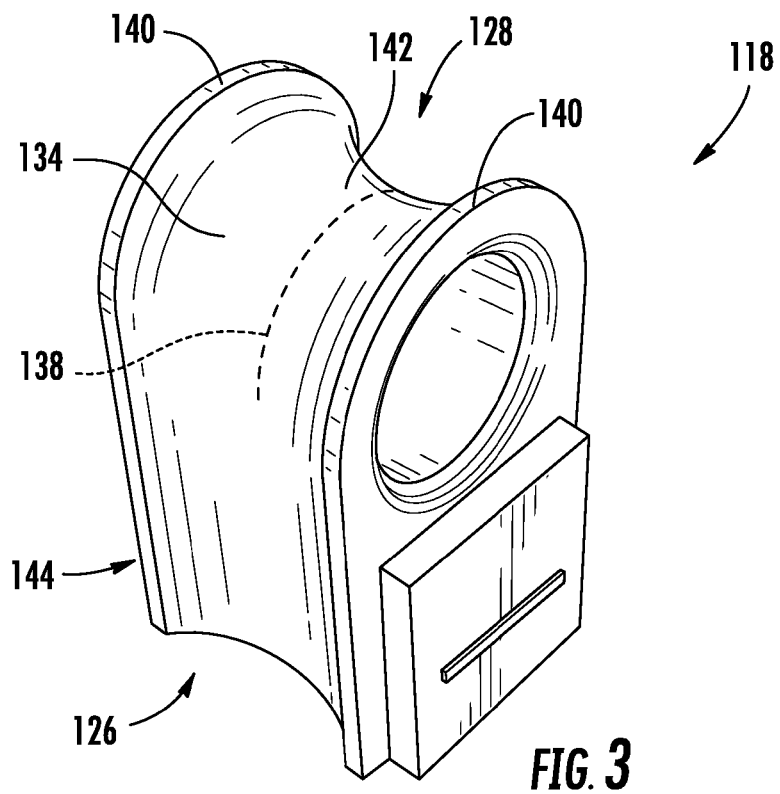
FIG. 3 is a perspective view of the cover of FIG. 2 from a second perspective.
Figure 4:
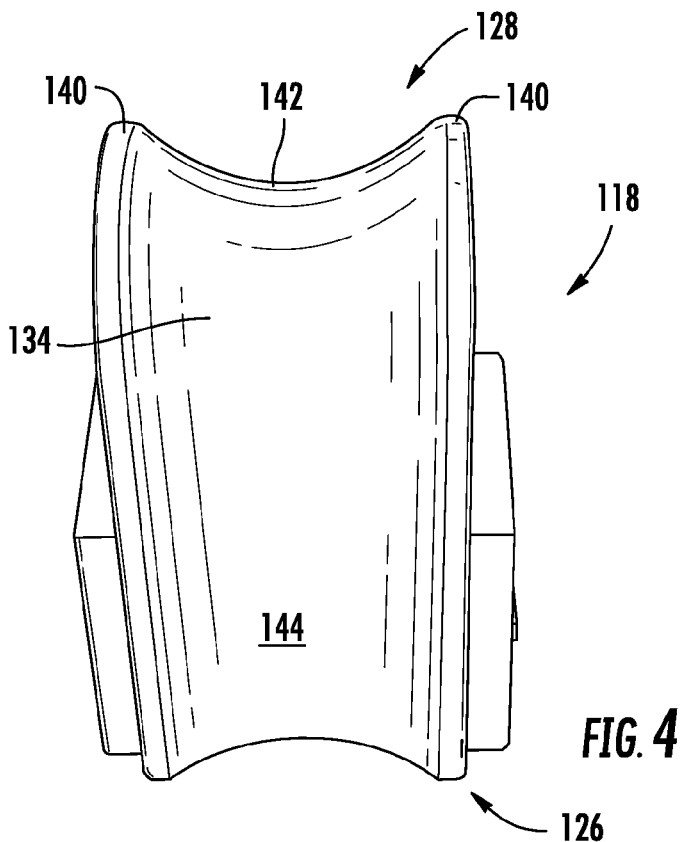
FIG. 4 is a perspective view of the cover of FIG. 2 from a third perspective.

Referring more-specifically to FIGS. 2-4, according to an exemplary embodiment, the track 134 of the cover 118 includes a bend 138, perhaps best shown in FIG. 3, that curves around the second end 128 of the cover 118. According to an exemplary embodiment, the bend 138 of the track 134 is arcuate (e.g., curved, bowed), such as round, oval, parabolic, etc., and has a radius of curvature throughout the bend 138 that is at all times greater than the minimum bend radius of the optical fiber 124. The bend 138 may be formed from several discrete surfaces or a single, continuous surface. In some embodiments, the bend 138 is round (i.e., circular) and the radius of curvature of the bend 138 is constant and is less than 1 cm (e.g., about 5 mm), which may be sufficiently large for use with Pretium EDGE® Solutions 144-fiber trunk cable having 2.9 mm round furcation legs, manufactured by CORNING CABLE SYSTEMS LLC, using CLEARCURVE® optical fiber (e.g., 50/125 µm multimode (OM3) fiber), manufactured by CORNING INCORPORATED. In other contemplated embodiments, other optical fibers and cables are used.

In some embodiments, the track 134 of the cover 118 allows the furcation legs 114 of the corresponding cable assembly 110 to be wrapped (e.g., folded, wound) over the second end 128 of the cover 118 without damaging the legs 114, including the optical fibers 124 of the legs 114 and the supporting structure, such as buffer tubes, strength members, etc. The minimum bend radius of an optical fiber is typically provided by the manufacturer of the particular optical fiber, such as in published commercial literature, and corresponds to the minimum bend radius that allows for a certain probability of mechanical reliability of the optical fiber for a given length or number of loops. For purposes of the present disclosure, the minimum bend radius of the optical fiber may be defined more-specifically as the minimum outside bend radius that the fiber can sustain such that the probably of a break in the optical fiber remains less than or equal to fifty percent for more than 1000 loops of the optical fiber at that radius, which may correspond to a minimum bend radius of less than 5 mm for some commercially-available optical fiber.

The minimum bend radius of a cable or supporting structure for optical fiber, different from that of the optical fiber itself, and may be defined as the minimum outside radius that the cable or supporting structure can bend without kinking or plastically deforming, which is typically provided by the cable manufacturer. In some embodiments, the bend 138 of the track 134 of the cover 118 has curvature so as to guide the bending of the legs 114 around the track 134 at a radius that is greater than the minimum bend radius of tubes or other support structure used with the furcated legs 114 to contain or support the optical fibers 124. If no minimum radius is provided by the cable manufacturer or if the manufacturer-provided value is unclear, then the minimum bend radius of the cable may be defined as fifteen times the diameter of the cable or supporting structure. As such, if unclear or undefined by the manufacturer, the minimum bend radius of tubes of the furcated legs 114 may also be defined as fifteen times the diameter of the tubes.

Still referring to FIGS. 2-4, in some embodiments the track 134 of the cover 118 includes raised sides 140 (e.g., walls, side walls) and a channel 142 (e.g., valley, well) between the raised sides 140 such that the track 134 is configured to guide one or more of the legs 114, constraining the legs 114 to stay within the track 134 when the legs 114 are tensioned and wrapped about the second end 128 of the cover 118. Accordingly, the track 134 may be U-shaped or three-sided. In some embodiments the base of the channel 142 is flat, while in other embodiments the channel 142 is concave between the raised sides 140. In some such embodiments, the track 134 generally forms a saddle about the second end 128 of the cover 118.

In some embodiments, the cover 118 is configured to receive two separate connectors 116, such that connector pairs (e.g., male and female connectors) may be bound together via the same cover 118 during packaging of the legs 114 and connectors 116 within the pulling grip 136 (FIG. 8) for installation of the interconnect assembly 110. Dual-connector covers 118, such as those shown in FIGS. 1-4 and 7-9, may be particularly useful for efficient handling and connection of the associated interconnect assembly 110 when installing the assembly in a data center where time-saving improvements and organizational-enhancing features may be particularly beneficial and valued. In other embodiments, covers may alternatively be configured to receive other numbers of connectors, such as with the cover 210 which is configured to receive only a single connector 212 (FIG. 6).

Figure 5:
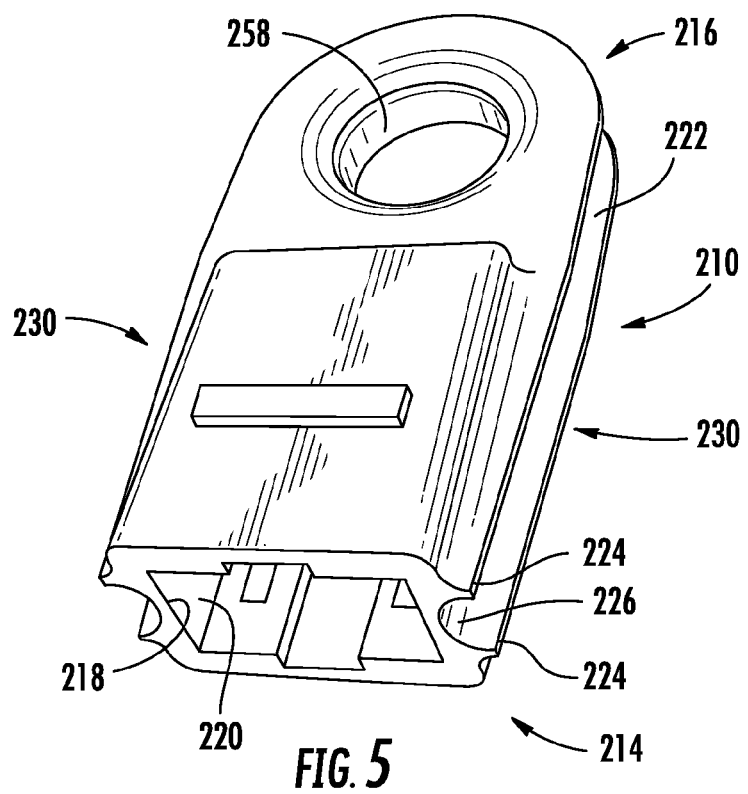
FIG. 5 is a perspective view of a cover of a connector of an interconnect assembly according to another exemplary embodiment.
Figure 6:
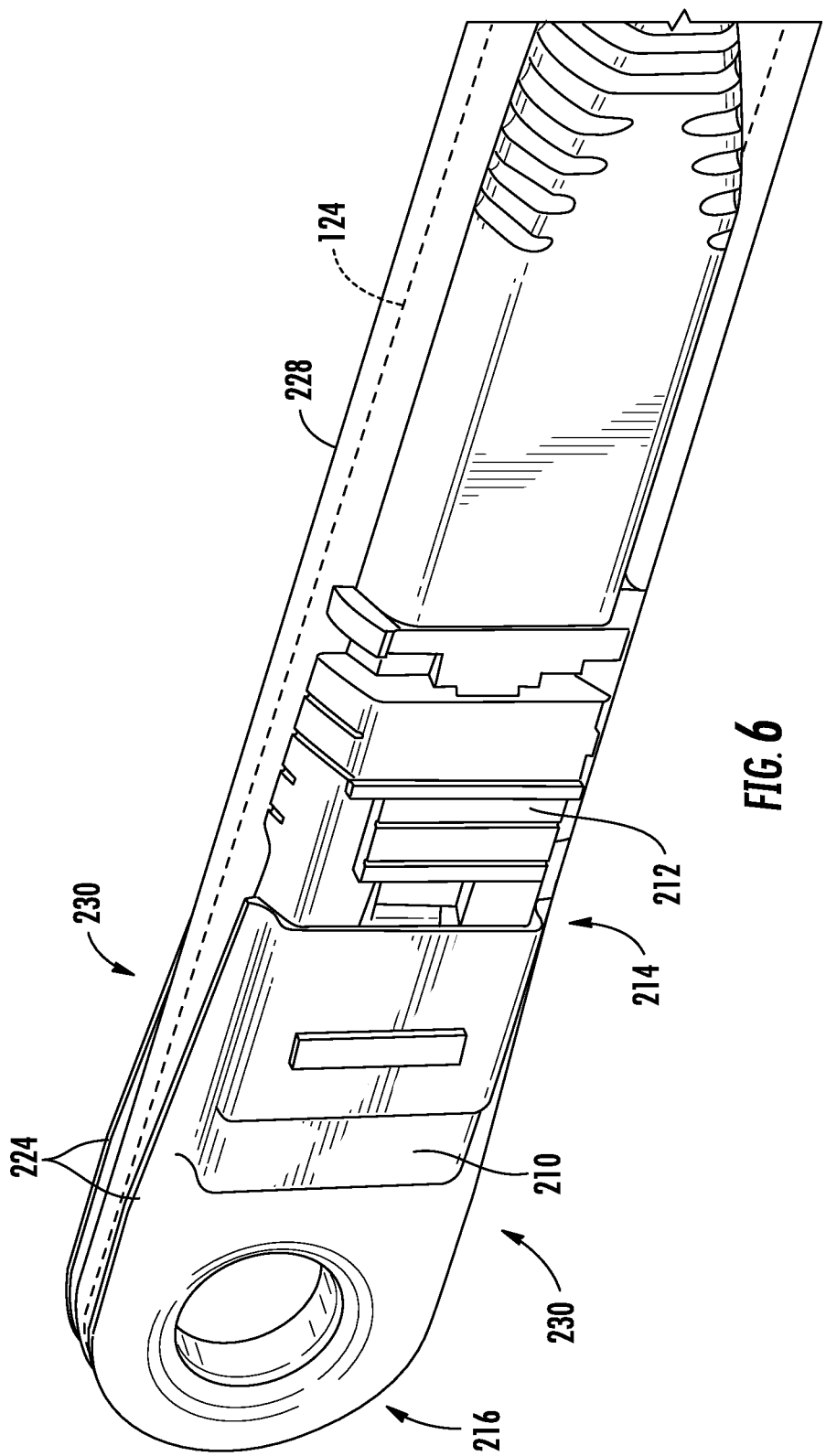
FIG. 6 is a perspective view of a connector attached to the cover of FIG. 5 with a furcated leg wrapped around the cover according to an exemplary embodiment.

Referring now to FIGS. 5-6, the cover 210 is attached to the connector 212, which may be attached to a leg of an interconnect assembly that uses an optical fiber cable (see, e.g., legs 114, assembly 110, and cable 112 as shown in FIG. 1), similar to the cover 118 shown in FIGS. 2-4. The cover 210 further includes a first end 214 and a second end 216. The first end 214 has an opening 218 (FIG. 5) directed to an interior 220 of the cover 210, and the opening 218 is configured to receive at least a portion of the connector 212 for placement of the portion of the connector 212 in the interior of the cover 210 (see FIG. 6).

According to an exemplary embodiment, the second end 216 is positioned generally opposite to the first end 214. The second end 216 includes a track 222 (FIG. 5) around an exterior (i.e., outside surface, periphery) of the second end 216, and the track 222 includes raised sides 224 and a channel 226 between the raised sides 224. In some such embodiments, the track 222 is configured to guide a leg 228 of the interconnect assembly when the leg 228 is wrapped around the second end 216 on the track 222.

According to an exemplary embodiment, the track 222 curves around the exterior of the second end 216 in a bend (see, e.g., bend 138 as shown in FIG. 3) that is arcuate such that the track 222 facilitates a controlled bending of the leg 228. In some embodiments the bend of the track 222 is more specifically a single, continuous, round bend. In other embodiments, the arcuate bend of the track 222 is formed from multiple surfaces; has a variable radius of curvature; or is oval, parabolic, or otherwise shaped.

In some embodiments, the cover 210 (or the cover 118) is a single, solid, integral piece. The piece may be injection molded or otherwise formed and may be formed from a plastic, a thermoplastic, a polymer, or other materials. Forming the cover 210 as a single, solid, integral piece allows freedom for folding or modifying the configuration of packaged legs 228, connectors 212, and covers 210 so that the configuration may be shaped to fit a particular duct or space (e.g., staggered or non-staggered arrangements of the connectors 212). Furthermore, use of discrete, individual covers 210 may reduce the quantity of materials and waste relative to other leg and connector management solutions. However, in other contemplated embodiments, the covers 210 may be integrated within a larger structure or compartment for controlled placement of the legs 228 and connectors 212 during movement of the associated interconnect assembly through a duct.

As shown with regard to the cover 210 in FIG. 6 and the cover 118 in FIGS. 2-3, the tracks 134, 222 of the respective covers 118, 210 may extend lengthwise along opposing sides 144, 230 of the covers 118, 210 between the first and second ends 126, 128, 214, 216 of the covers 118, 210. In some embodiments, the tracks 134, 222 extend fully along the opposing sides 144, 230 of the respective covers 118, 210, while in other embodiments tracks only extend along a portion of the opposing sides 144, 230. Extending the tracks 134, 222 along opposing sides 144, 230 of the respective covers 118, 210 between the first and second ends 126, 128, 214, 216 may help to reduce sources of concentrated stress on the legs 114, 228 and may also facilitate a narrower folded configurations of the legs 114, 228, connectors 116, 212, and covers 118, 210 for placement of the interconnect assembly 110 in the pulling grip 136 to be moved through a narrow space (see generally FIGS. 7-8). In still other contemplated embodiments, the tracks 134, 222 terminate at the second end 128, 216 and do not extend along the sides 144, 230 of the corresponding covers.

Referring now to FIGS. 7-8, the cover 118 of FIGS. 2-4, in conjunction with other such covers 118, is configured to facilitate wrapping of the legs 114 and connectors 116 of the interconnect assembly 110 into a narrow arrangement 146 (e.g., package; tight, elongate bundle) with the legs 114 wrapped around ends 128 of the covers 118 (see also FIGS. 2-4). The connectors 116 are ganged such that the connectors 116 are arranged and fixed together in an orderly manner for packaging, such as fixed to one another such that all of the connectors 116 are within a footprint sized to be received by the corresponding pulling grip 136, such as within a span of less than a foot long, or such that each connector 116 is within at least three inches from another of the connectors 116 in the ganged arrangement. While a cover 118 is attached to a connector 116 attached to a particular leg 114, the leg 114 wrapped about that cover 118 may not necessarily be the same leg 114 that is attached to the connector 116 attached to that cover 118. Furthermore, more than one leg 114 may be wrapped around one of the covers 118.

As shown in FIG. 7, the legs 114 and connectors 116 may be bound together with the connectors 116 arranged in a staggered configuration such that the covers 118 (attached to the connectors 116) do not overlap one another lengthwise along the interconnect assembly 110, allowing the legs 114, connectors 116, and covers 118 to be positioned within the pulling grip 136 (FIG. 8). In general, staggering the connectors 116 allows for narrower configurations of the legs 114, connectors 116, and covers 118 when bound together in the arrangement 146 shown in FIG. 7 or in a similar manner. As such, staggering the connectors 116 may allow use of pulling grips 136 having particularly reduced diameters compared to other leg and connector management solutions. In other embodiments using the covers 118, the connectors 116 and legs 114 may be bundled together without staggering the connectors 116.

In some embodiments, binders 148, clips, tape, bands, or other fasteners may be used to hold the legs 114 to the covers 118 as well as to hold the legs 114, connectors 116, and covers 118 together in the narrow arrangement 146 for placement within the pulling grip 136. Preferably the binders 148 are not zip ties and do not require sharp removal tools during installation of the interconnect assembly 110. According to an exemplary embodiment, the covers 118, in conjunction with the binders 148, allow for tool-less removal and deployment of the pulling grip 136, binders 148, and covers 118. In other contemplated embodiments, the binders 148 may be zip ties or require sharp removal tools.

As shown in FIG. 8, the interconnect assembly 110 may include the pulling grip 136, where the legs 114 and connectors 116 are bound together using the covers 118 and the pulling grip 136 is coupled to (e.g., surrounds, encases, encloses) the legs 114, connectors 116, and covers 118. In some embodiments, the pulling grip 136 includes a mesh that may contract around the packaged legs 114 and connectors 116 when drawn longitudinal by way of a loop 150 or hook on the end of the pulling grip 136. In other embodiments, the pulling grip 136 includes a zipper sleeve or a bag, such as a heat-shrink bag. In still other embodiments, the pulling grip 136 includes a rigid case or shell.

In some embodiments, the pulling grip 136 is attached (e.g., secured) to the jacket 120 of the optical fiber cable 112 and force used to draw the pulling grip 136 through a duct is transferred to the jacket 120. In other embodiments, the pulling grip 136 is attached to reinforcement material 152 extending through the optical fiber cable 112, such as aramid yarn or glass-reinforced plastic rods, and pulling force is transferred to the reinforcement material 152. In still other embodiments, the pulling grip 136 may be attached only to the legs 114, or may be attached to multiple components of the interconnect assembly 110, such as to the reinforcement material 152 and to the jacket 120, as shown in FIG. 8.

Figure 9:
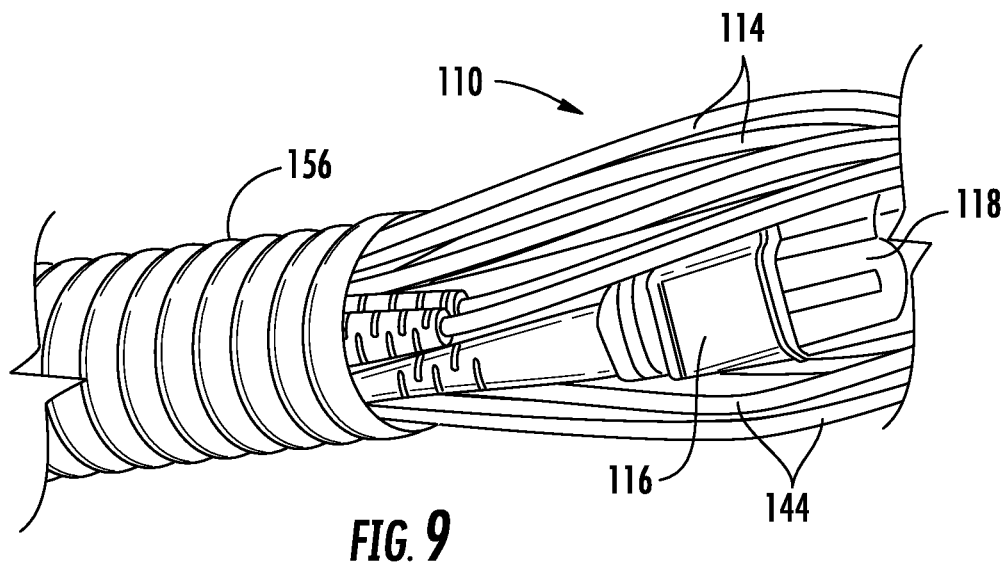
FIG. 9 is a perspective view of the interconnect assembly as arranged in FIG. 7 extending within a protective tube configured to provide crush-resistance to the interconnect assembly according to an exemplary embodiment.
Figure 10:
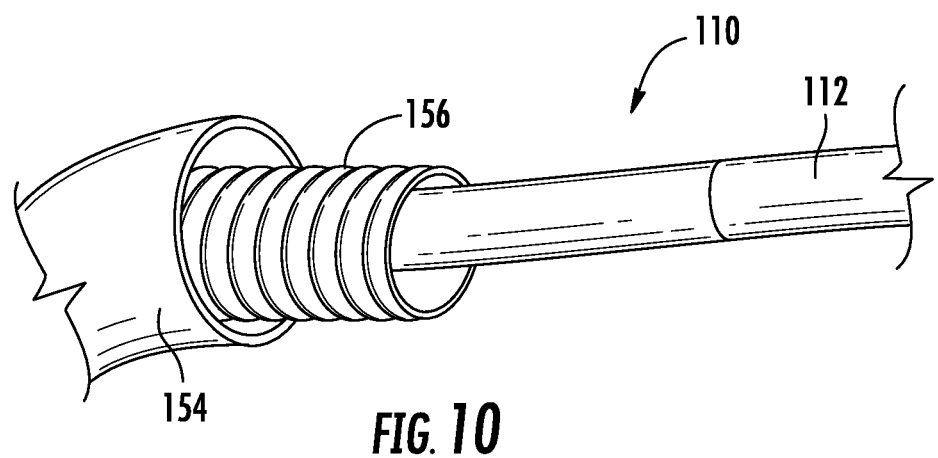
FIG. 10 is a perspective view of the interconnect assembly and protective tube of FIG. 9 extending within a duct according to an exemplary embodiment.

Referring now to FIGS. 9-10, the covers 118, 210 may be used with the pulling grip 136 to pull the interconnect assembly 110 through a duct 154. In some embodiments, the covers 118, 210 facilitate pulling a 144-fiber cable assembly through a one-and-a-quarter inch duct, such as a 1¼ inch MAX-CELL™ Innerduct duct produced by MAXCELL of Wadsworth, Ohio, or another duct. Put another way, the cross-section of the pulling grip 136, while surrounding the legs 114, connectors 116, and covers 118, is less than one-and-a-quarter inches wide such that the interconnect assembly 110 is movable within the duct 154 in some such embodiments.

Additionally, the covers 118, 210 may further allow the interconnect assembly 110 to be inserted in a crush-resistant protective tubing 156 (e.g., corrugated conduit), which may then be inserted in the duct 154. The crush-resistant protective tubing 156 may have a diameter of one inch such that the cross-section of the pulling grip 136, while surrounding the legs 114, connectors 116, and covers 118, is less than one inch wide. According to an exemplary embodiment, the interconnect assembly 110 with the covers 118, 210 is configured to enable the use of a three-quarter inch inside-diameter pulling grip 136 to house and protect the connectorized legs (e.g., twelve connectorized legs containing twelve fibers each).

According to an exemplary embodiment, the covers 118, 210 synergistically provide various benefits to the interconnect assembly 110 or other such assemblies, such as when used for packaging in a pulling grip. Embodiments of the integrated cover and leg management systems disclosed herein allow manufacturers to package high-fiber count cables in smaller diameter pulling grips. The covers 118, 210 further limit bending of the optical fibers 124 and cable components (e.g., leg 114 tubes), and may also reduce preferential cable bending once the associated interconnect assembly 110 is installed.

According to an exemplary embodiment, the track 134 of the cover 118 guides bending of the leg 114 so as to avoid over-bending of the optical fiber(s) 124 in the leg 114. Wrapping the leg 114 around the cover 118 additionally supports the connector 116 by using the leg 114 itself to oppose forces that may otherwise inadvertent pull off or disconnect the connector 116 as the interconnect assembly 110 is drawn through the duct 154. Put another way, a leg 114 wrapped about the cover 118 may hold the connector 116 on the leg 114. Furthermore, the covers 118, 210 may be airtight and friction fit to the connectors 116 so that the covers 118, 210 serve to protect the connectors 116 from dust and debris as the connectors 116 are moved through the duct or elsewhere. A hole 158, 258 (FIGS. 2 and 5) in the covers 118, 210 may be used for hanging the associated connectors 116 and legs 114 on a hook.

The construction and arrangements of the connector and leg management system for the interconnect assembly, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An interconnect assembly, comprising:
 an optical fiber cable, comprising:
  a jacket having an interior defining a passage; and
  sub-units extending through the passage, wherein the sub-units comprise optical fibers extending lengthwise through the sub-units;
 legs extending from the passage on an end of the jacket, wherein the legs are continuations of or extensions from the sub-units such that the optical fibers further extend through the legs;
 connectors attached to the optical fibers on distal ends of the legs; and
 covers attached to the connectors, wherein the covers each comprise an end having a track for wrapping one or more of the legs over to package the legs and connectors for placement of the legs and connectors within a pulling grip for installation of the interconnect assembly through a duct,
 wherein the track of each cover comprises a bend around the end of the cover and wherein the bend is arcuate and has a radius of curvature throughout the bend that is greater than the minimum bend radius of the optical fiber.

2. The interconnect assembly of claim 1, wherein the track of each cover comprises raised sides and a channel between the raised sides such that the track is configured to guide the one or more of the legs when wrapped about the end of the respective cover.

3. The interconnect assembly of claim 2, wherein the connectors are ganged connectors, and wherein each cover is configured to receive multiple sets of the ganged connectors such that pairs or sets of the ganged connectors may be bound together for packaging of the assembly.

4. The interconnect assembly of claim 2, wherein each cover is configured to receive two separate connectors such that connector pairs may be bound together during packaging.

5. The interconnect assembly of claim 4, wherein the bend of each track is a single, continuous, round bend.

6. The interconnect assembly of claim 1, further comprising the pulling grip, wherein the legs and connectors are bound together using the covers, and wherein the pulling grip surrounds the legs, the connectors, and the covers.

7. The interconnect assembly of claim 6, wherein the legs and connectors are bound together with the connectors staggered such that the covers attached to the connectors do not overlap one another lengthwise along the interconnect assembly within the pulling grip.

8. The interconnect assembly of claim 6, wherein, when surrounding the legs, the connectors, and the covers, the pulling grip is sized to move through a standard one-and-a-quarter inch duct.

9. The interconnect assembly of claim 1, wherein each of the covers consists of a single, solid, integral piece.

* * * * *